BISTABLE BORON SEMICONDUCTOR OR SWITCHING DEVICE
Filed May 11, 1965 
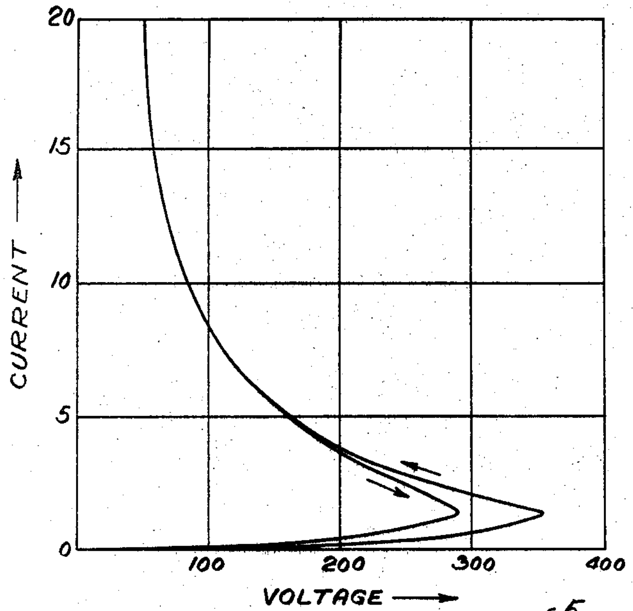
Fig. 1.
Fig. 2.
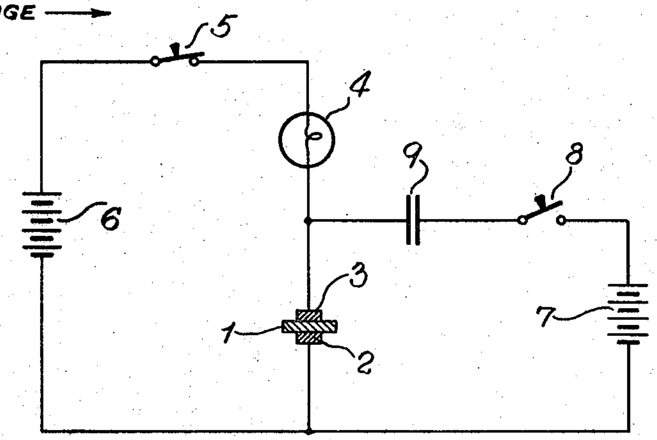
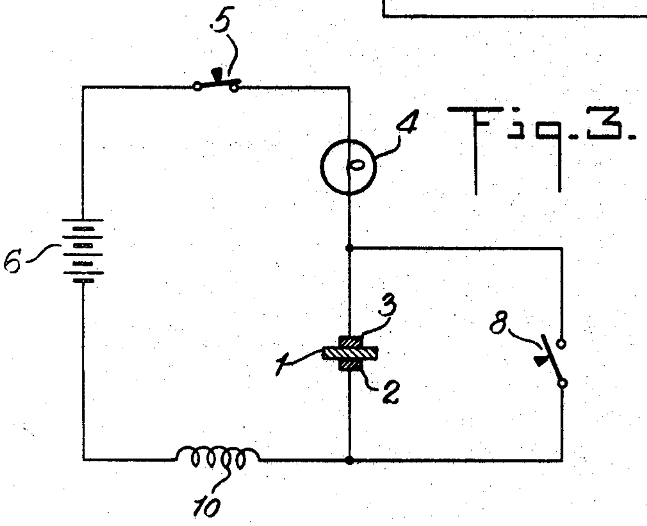
INVENTORS
HERMANN HELMBERGER
WOLFGANG DIETZ
FRITZ GUTBERLET
HANS HERRMANN
HANS WITTMANN AKA
JOHANN WITTMANN
D Malcolm
ATTORNEY INVENTORS
HERMANN HELMBERGER
WOLFGANG DIETZ
FRITZ GUTBERLET
HANS HERRMANN
HANS WITTMANN AKA
JOHANN WITTMANN D Malcolm
ATTORNEY INVENTORS
HERMANN HELMBERGER
WOLFGANG DIETZ
FRITZ GUTBERLET
HANS HERRMANN
HANS WITTMANN AKA
JOHANN WITTMANN D. Malcolm
ATTORNEY

BISTABLE BORON SEMICONDUCTOR OR SWITCHING DEVICE

INVENTORS
HERMANN HELMBERGER
WOLFGANG DIETZ
FRITZ GUTBERLET
HANS HERRMANN
HANS WITTMANN AKA
JOHANN WITTMANN

D Malcolm
ATTORNEY

INVENTORS
HERMANN HELMBERGER
WOLFGANG DIETZ
FRITZ GUTBERLET
HANS HERRMANN
HANS WITTMANN AKA
JOHANN WITTMANN
D Malcolm
ATTORNEY United States Patent Office 3,421,054

Patented Jan. 7, 1969

3,421,054
BISTABLE BORON SEMICONDUCTOR OR SWITCHING DEVICE

Hermann Helmberger and Wolfgang Dietz, Munich, Fritz Gutberlet, Burghausen-upper Bavaria, and Hans Herrmann and Hans Wittmann, also known as Johann Wittmann, Munich, Germany, assignors to Consortium fur Elecktrochemische Industrie G.m.b.H., Munich, Germany, a corporation of Germany Filed May 11, 1965, Ser. No. 454,945
Claims priority, application Germany, May 14, 1964, C 32,914; July 28, 1964, C 33,915
U.S. Cl. 317—234 4 Claims
Int. Cl. H01l 3/00

ABSTRACT OF THE DISCLOSURE

The invention provides a bistable semiconductor device for switching and controlling direct and alternating currents, comprising an elementary boron semiconductor element which has no P–N junction and to which at least two electrodes are directly attached.

This invention relates to semi-conductor devices and it has for its object to construct and utilize such devices in a novel manner for controlling and regulating electrical systems in numerous situations in the industrial arts.

Another object of the invention is to utilize semiconductor devices for controlling and regulating both direct and alternating current electrical systems, without requiring a duplication of elements for handling the positive and negative half-waves of an alternating current.

Still another object is to provide a novel and improved process for manufacturing semi-conductor devices employing boron for switching purposes in systems of the type specified.

In electrical switching technology electronic switches are being used more and more, for example as switches which make switching possible without any contacts. Such switching elements are brought by a control magnitude (e.g. a control current or control voltage) from a non-conducting or poorly conducting condition into a good conducting condition. In one group of such switches (e.g. thyratrons, semi-conductor controlled rectifiers) the conducting stage is created by a short impulse and then automatically maintained until the operating voltage sinks below a certain value (extinguishing voltage). These switches have two stable working points, while the area between these points is unstable.

In another group (e.g. electronic tubes, switching transistors) the magnitude of the control signal creates the "on" or "off" condition. Contrary to the first-named group, these can be opened and closed by the control magnitude. The area between the on and off condition of these switching elements can as a rule be bridged only for short periods due to the considerably greater power dissipation in this range, so that these switches, too, must be considered as elements with two permissible working points.

The two above groups thus have one thing in common, namely that the switching process occurs quickly, or that it must take place. A slow transition from non-conducting to a conducting state or vice versa is basically impossible in the case of thyratrons and controlled rectifiers, in the case of electronic tubes and switching transistors only with proportionately larger dimensions, and therefore higher permitted power dissipation of the devices. Although in a great many cases a shortest possible switching time is required, there still are applications where the switching-on or switching-off periods can be controlled. Moreover, all electronic switches named above can be made conductors only for one direction of the current, so that for switching both half-waves of an alternating current, for instance, two elements are always required. To operate the tube switches with heated cathodes the necessary heating capacity must be provided, for the manufacture of said solid-state switches a semiconductor element with one or several P–N junctions is necessary.

The object of the present invention is the use of boron in semi-conductor devices which are used as switches or circuits elements for controlling and regulating direct and alternating currents. On these switches no P–N junctions are necessary. According to the invention, such a switch may consist of a disc or a small plate of elementary boron to which two or more electrodes are fastened with suitable contacts. Several of these electrodes may at the same time be designed as cooling surfaces; the boron used may be polycrystalline, monocrystalline or sintered of of amorphous or crystalline boron powder.

Also, suitable doping substances may be added to the boron. The dimensions of the piece of boron as well as its crystalline structure and dopings are chosen depending on the intended purpose of use; also, the size, material and shape of the electrodes may be adapted to the existing requirements.

An additional device for heating the element may also be provided; in most cases, however, no additional heating is necessary. For instance, the little boron plates can be cut off as discs from mono- or polycrystalline boron rods and subsequently subjected to after-treatment by grinding, etching and polishing. They can also be obtained in the necessary dimensions by melting.

Thin boron layers can also be obtained by the decomposition of a boron compound, e.g. of a boron halide, on a heated high-melting metal, like tantalum. The metal on which the deposition is done serves at the same time as an electrode. The deposition of the boron can also be done from diborane and/or boron halides, if necessary in admixture with hydrogen.

The following process can also be used: a thin plate of suitable material, e.g. boron nitride, is provided with a series of drilled holes. The plate is immersed in a boron melt and then pulled out. The holes in the plate are filled with liquid boron which is held together by its surface tension. After solidifying, these boron platelets can be sawed or broken off from the boron nitride plate.

The electrodes can be applied by alloy, vapor or by cathode spray. The connection to the electrodes is done by soldering, welding or by pressing on the contacts, particularly also by pressing on large-surface metal sheets which at the same time serve for cooling.

The invention is described in connection with the accompanying drawings, in which similar reference numerals represent corresponding parts in the several views, and in which:

FIG. 1 is a graphic representation of the current/voltage characteristic of boron employed in carrying out the invention;

FIGS. 2 and 3 are circuit diagrams illustrating the use of a semi-conductor device as a direct current switch;

FIGS. 13 and 14 are schematic views of a system employing two semi-conductor devices for controlling and/or regulating the filling level of a container of liquid.

Figure 4:
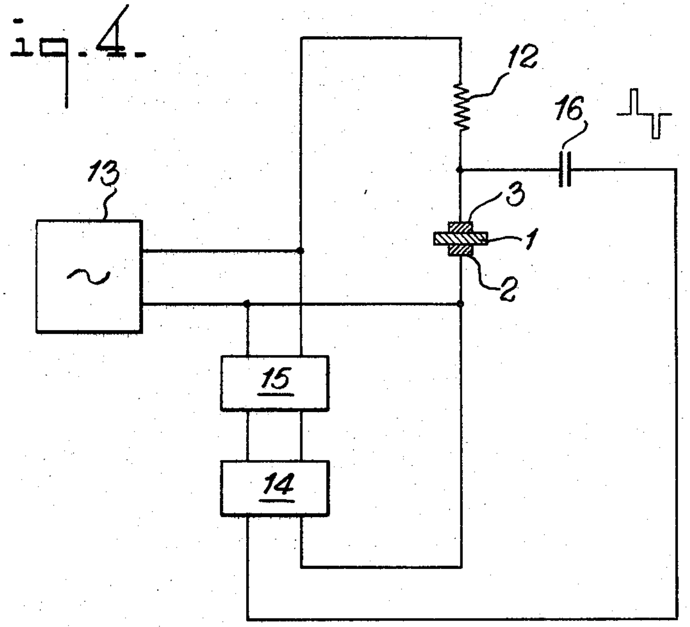
FIG. 4 is a schematic diagram of a circuit employing a semi-conductor device for controlling an alternating current.

The effect of the devices of our invention is based on the application of the current/voltage characteristic of boron. This is depicted in its basic form in FIG. 1 for the purest polycrystalline boron without doping. If a voltage is applied to a boron sample equipped with two electrodes, the current (here in milliamperes) in the beginning increases only very slowly in a linear form when the voltage is incretsed, in accordance with the high resistance of boron at room temperature (the resistivity of pure boron at room temperature is about $10^6$ ohm cm.).

On reaching a certain current ("ignition current") the voltage on the boron sample suddenly drops, while the current increases sharply and is limited only by a resistance within the circuit. The resistance of the boron in this range is smaller by a few units than before the ignition and does not reach its original value until the current through the sample has been decreased to a certain value ("quenching current").

The physical explanations for the occurrence of this characteristic have not yet been clarified completely. Essentially, however, the strong negative resistance-temperature coefficient of boron and the heating taking place during the passage of the current through boron may be included in the explanation.

It has been found that the necessary "ignition current" as well as the time for the transition from the poor conducting to the good condutcing state and vice versa can be influenced largely by the dimensions of the small boron plate and of the electrodes and the cooling surface, if any. For instance, with thin plates of about 70$\mu$ thickness and a section of several square millimeters one can achieve switching times of several microseconds. If even thinner layers are used, even shorter switching times are possible. The time for the switch-on event can also be affected by the voltage applied and by resistances arranged in series. With a constant thickness of the small boron plate a certain minimum voltage is first required to trigger the switching process. Above that minimum value, the switching-on time then depends on the voltage applied and on the size of the resistance placed in series in the circuit. The following instances of application show the operation of the switches of the invention.

FIG. 2 shows an example for a circuit using the semi-conductor device as a direct current switch. A small boron plate 1 is mounted between two electrodes 2 and 3. The small boron plate is connected in series with an incandescent lamp 4 and an off-pushbutton 5 to a direct current source of voltage 6. Parallel with the boron plate is a direct current voltage source 7 in series with an on-pusbutton 8 and a conductor 9. The voltage of source 6 is so adjusted that only a small residual current first flows through pushbutton 5 and incandescent lamp 4 and the boron plate 1. If the on-pushbutton 8 is actuated, a higher voltage occurs for a short period at electrodes 2 and 3, the intensity of which is determined by the source 7. The plate is thereby brought into a conducting state and the circuit of source 6 is closed for the incandescent lamp 4. By opening the switch 5, the lamp 4 can be switched off again by lowering the current on the boron plate below the "quenching current."

The switching-on of the semi-conductor element can also be done without an additional starting source. This is shown in FIG. 3. In this circuit there is also an inductance 10 in series with the boron plate 1, while parallel to the plate there is only an on-pushbutton 8. As in FIG. 2, there is only a small residual current at the beginning. If the on-pushbutton 8 is actuated, the semi-conductor switch is shorted and the full current runs in the circuit. If the current is now interrupted by pushbutton 8, the boron plate becomes conducting due to the induction shock from the inductance coil 10 and the circuit remains clocked until it is re-opened by the off-pushbutton 5.

FIG. 4 shows schematically a circuit for using the semi-conductor device for controlling an alternating current which has a frequency of, say, 50 cycles. The semi-conductor device 1 is connected in series with a loading resistance 12 to the alternating voltage source 13. Also connected to the voltage source 13 is a pulse shaper 14 through a phase shifter 15. In the simplest case the phase shifter 15 can consist of a condenser and a variable resistance. For the pulse shaper 14 one can use a semi-conductor device of boron.

The pulse shaper 14 produces for each positive half-wave of the alternating current a short positive pulse and for each negative half-wave of the alternating current a short negative pulse; the phase position of these pulses can be shifted in relation to the voltage of the source 13 by the phase shifter 15. Through a coupling condenser 16 these pulses reach the semi-conductor device. The semi-conductor device is so proportioned that at the existing voltage from source 13 only a small residual current flows at the beginning through the loading resistance 12.

When a pulse from the pulse shaper 14 now reaches the semi-conductor device through condenser 16, the latter becomes conducting and the current flows through the loading resistance 12 until the amount of the instant value of the alternating current has sunk below the cut-off current of the semi-conductor device. The priming of the next half-wave is caused by the next pulse delivered by the pulse shaper 14.

Figure 5:
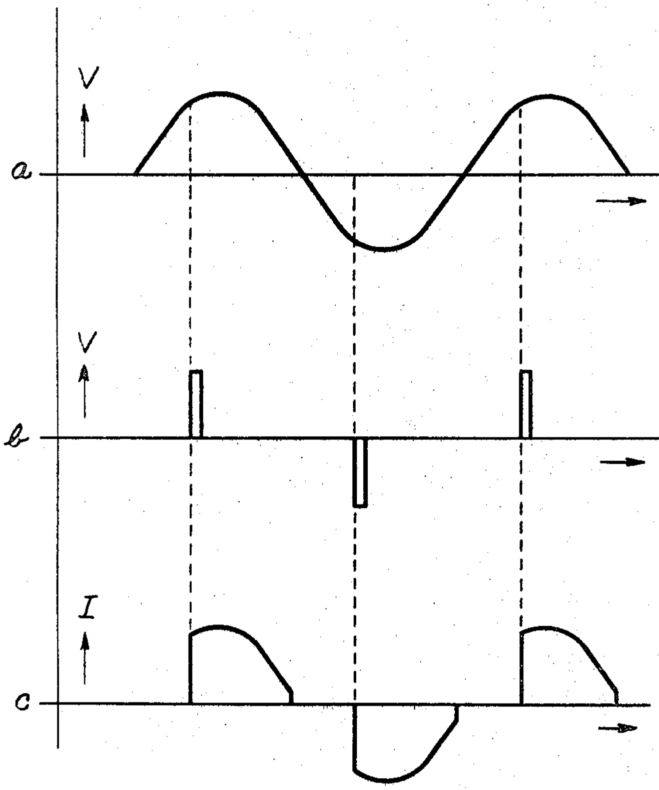
FIG. 5 is a graphic representation of the voltages and currents in the circuit of FIG. 4 as a function of time.

FIG. 5 depicts the time dimensions of the currents and voltages in the circuit of FIG. 4. FIG. 5*a* shows the voltage of source 13. FIG. 5*b* shows the pulses delivered by the pulse shaper 14, which in the diagram shown have a phase shift of 60° with respect to the voltage of source 13, and finally FIG. 5*c* represents the current through the loading resistance 12.

Figure 6:
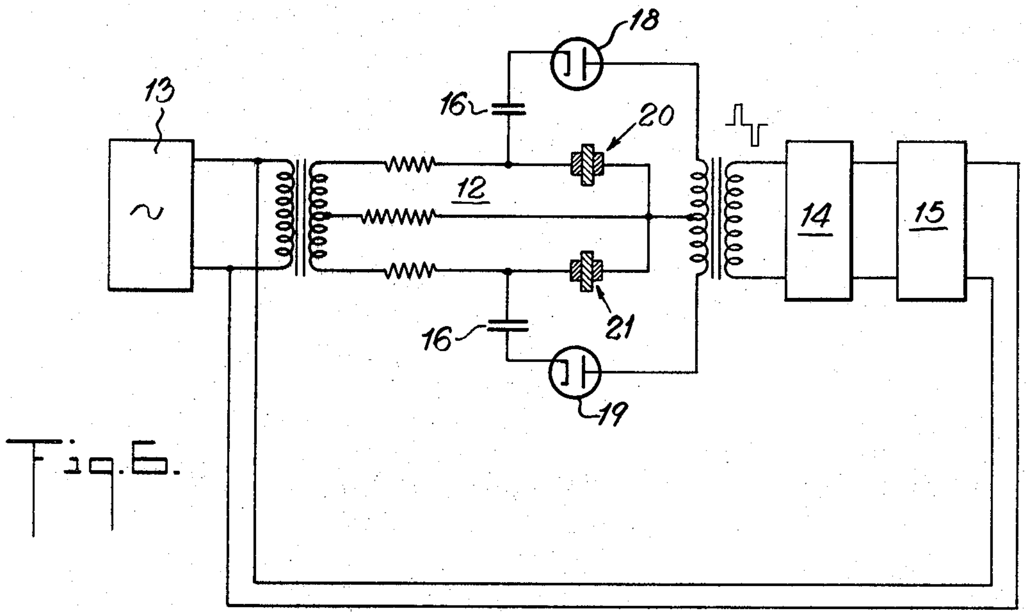
FIG. 6 is a diagramatic illustration of a full-wave rectifier circuit employing two semi-conductor devices.

By using two semi-conductor devices of the kind described and an addition of two diodes one can also build a controlled full-wave rectifier as per FIG. 6. On principle the operation is the same as that of the alternating current control of FIG. 4. Due to the diodes 18 and 19, however, in this case the semi-conductor devices 20 and 21 are made conductive alternately, so that one device passes the positive and the second, the negative half-wave.

The circuit arrangements shown here are only examples of the manifold uses of boron semi-conductor devices. Other uses are e.g. bi-stable or mono-stable flip-flop circuits, ratchet circuits, vibrators, over-voltage arrestors, overheating protections, etc.

During further experiments it has been found that the switching-on of the semi-conductor device can also be initiated by raising the surrounding temperature and/or by additional heating of the boron contained in the semi-conductor device, while the switching-off of the semi-conductor device is achieved by lowering the surrounding temperature and/or by additional cooling of the boron contained in the semi-conductor device.

The surrounding temperature necessary for the switching event and the switching-on of the semi-conductor device can be achieved by getting the semi-conductor device in good thermal contact with a structural part or equipment which heats up in operation, preferably by electricity. On reaching the maximum permissible temperature of such part or device, apparatus is activated which prevents any further temperature increases of the part or device. It is also possible to signal the attainment of the maximum permissible temperature by known means, e.g. optically or acoustically.

It is possible to increase the surrounding temperature as well as the temperature of the boron itself by attaching the boron in a thin layer and in the known manner to a metal wire, e.g. of molybdenum, tungsten, tantalum or vanadium steel, and heating the metal wire by passing a current through it.

Additional cooling of the semi-conductor device can be achieved by immersing into a cooling bath, for instance.

EXAMPLE 1

Figure 7:
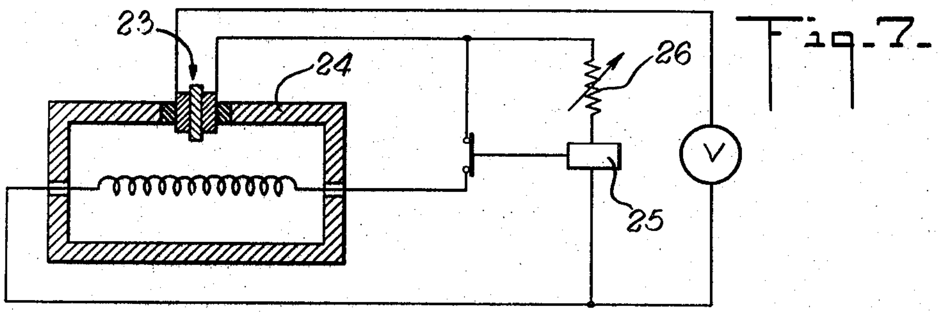
FIG. 7 is a schematic diagram of a system employing a semi-conductor device to protect an object against excessive heat.

FIG. 7 shows a schematic arrangement where the semiconductor device protects apparatus and structural elements against inadmissible heat, particularly such as are heated by electric current.

The semi-conductor device 23 is in good thermal contact with structural object 24 whose temperature is to be controlled. Structural object 24 can be, for instance, the bottom of an electric water boiler, the wall of a hot-water storage tank or the jacket of an immersion heater, but also the anode of a triode or the anti-cathode of an X-ray tube. Whether the controlling electrical circuit must be entirely insulated electrically from the structural element or whether one electrode of the semi-conductor device may also be electrically connected with the structural object to be protected, depends on the applicable safety specifications. For instance, a direct connection of an electrode is possible with the anode of a triode; in that case the boron layer may be applied directly on the anode, as by deposition or precipitation in vapor form.

If the temperature on the electrodes of the semiconductor device or on the boron itself increases above a certain value, then semi-conductor device 23 is switched on. Relay 25 is energized and interrupts, for instance, the heating circuit. The operation of relay 25 may also be used for signalling the increased temperature or for closing or opening valves, etc. in any suitable manner. Fine adjustment of the switch-off temperature is made possible by the variable resistance 26.

EXAMPLE 2

Figure 8:
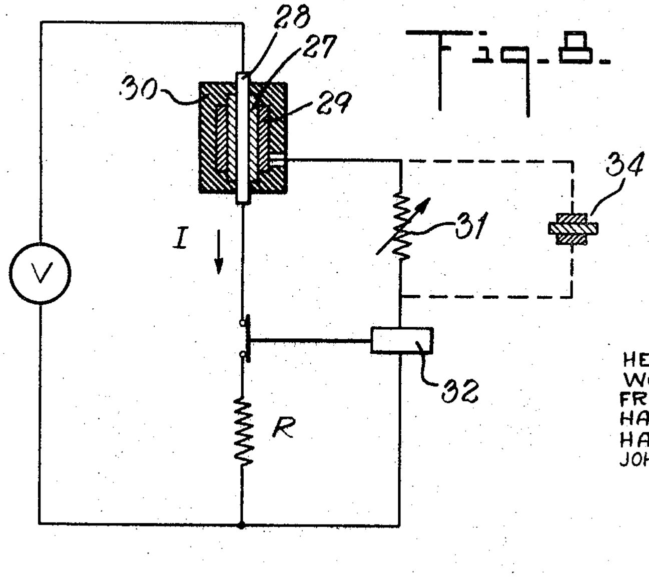
FIG. 8 is a schematic diagram of a system employing semi-conductor devices to protect a circuit against excess current.

FIG. 8 shows schematically the use of a semi-conductor device for circuit protection fusing and/or for a thermally delayed excess current release. There the boron layer 27 has been applied directly to a metal wire 28. The metal wire 28 may be made, for instance, of tantalum, molybdenum, tungsten or vanadium steel, and the boron layer can be obtained by decomposition of a boron-containing compound, e.g. of a boron halide, in the known manner. The operating current I flows through the metal wire 28. At the same time the metal wire is one of the electrodes of the semi-conductor device.

The second electrode 29 is applied to the boron layer, for instance by precipitation in vapor form, alloying or cathode spraying. In the simplest case the second electrode 29 can be made by pressing a metal onto the boron layer 27. The electrode 29 is surrounded by a thermally and electrically insulating layer 30, e.g. of a ceramic pipe or a poured resin. The semi-conductor element is so dimensioned that at the nominal value of the current I only a small residual current flows from metal wire 28 through the boron layer 27, the electrode 29, the variable resistor 31 and the winding of relay 32. If a larger current I flows through the metal wire 28, the temperature of the electrodes as well as the temperature of the boron layer is increased. When a certain temperature is reached which corresponds with a certain current through the metal wire 28, the semi-conductor element switches on relay 32, whereby, for instance, the working circuit is interrupted. Additional devices, like free release of the contact which interrupts the circuit, or a switch-on lock can be installed in any suitable manner. By the resistor 31 the current is set which after a predetermined period causes the switch-off (quick release or thermally delayed excess current release).

If resistor 31 is set for thermally delayed excess current release, then for a quick short circuit release device another semi-conductor device 34 of boron can be connected in parallel to this resistor. This is dimensioned in such a manner that at the time of the thermal excess current release it still is switched off. If the current increases, e.g. in case of a short circuit, considerably over this value, then the semi-conductor device 34 is switched on due to the now reduced series resistance for the semi-conductor element 34 which is formed by the constant resistance of the winding of relay 32 and the resistance of the boron layer 27. By switching on the semi-conductor element 34, however, the series resistance for the semi-conductor element from the metal wire 28, the boron layer 27 and the electrode 29 also gets smaller. Thereby the current in relay 32 increases rapidly and causes a quick switch-off.

EXAMPLE 3

Figure 9:
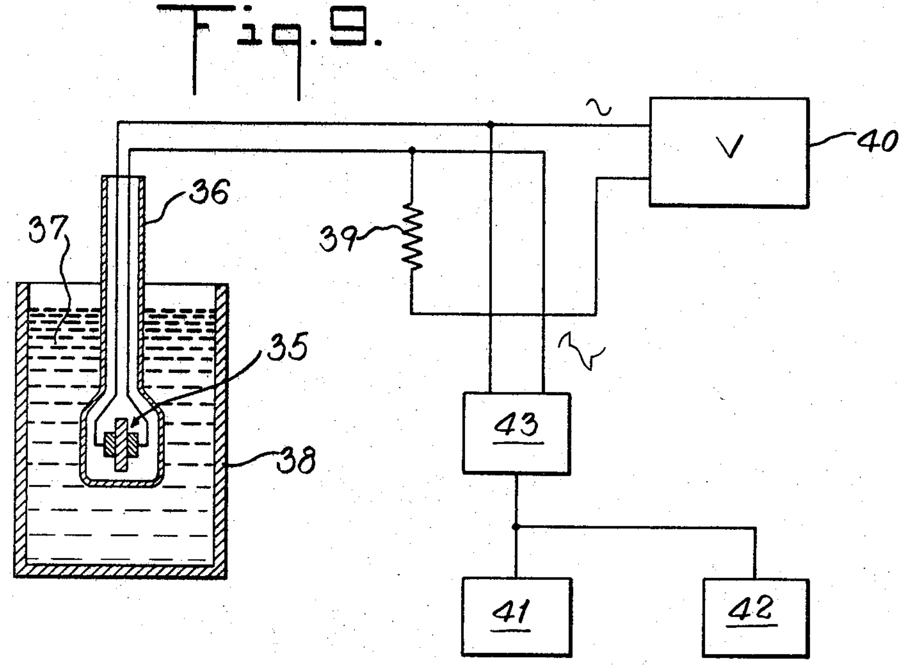
FIG. 9 is a schematic diagram of a system employing a semi-conductor device for measuring and/or regulating temperatures, for example of a liquid contained in a vessel.
Figure 10:
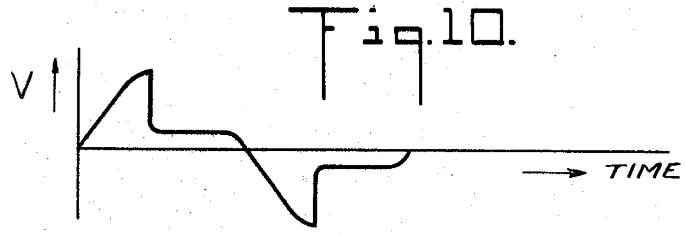
FIGS. 10 and 11 are diagrams which illustrate graphically the time course of the voltage on the semiconductor device of FIG. 9 under different temperature conditions.
Figure 11:
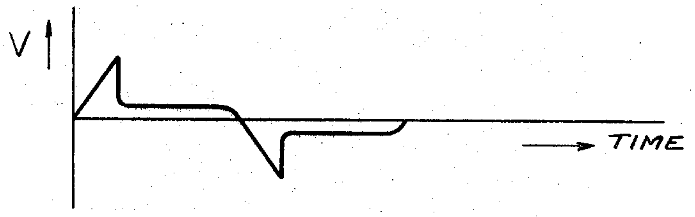

FIG. 9 shows schematically an arrangement wherein a semi-conductor device 35 serves for measuring and/or regulating temperatures. The semi-conductor device 35, which is placed in a sapsule 36, if necessary, is in the best possible thermal contact with, for instance, a liquid 37 whose temperature is to be measured and which is contained in a vessel 38. The semi-conductor element 35 is connected in series with a resistor 39 to a voltage source 40. The voltage source 40 supplies an alternating voltage whose frequency and amplitude are constant. For instance, the frequency may be 50 cycles. The amplitude is adjusted in such a manner that in case of the lowest temperature of the liquid 37, the semi-conductor element 35 switches on a little below the peak value of the voltage. The voltage then occurring on the semi-conductor element 35 has the time course as shown in FIG. 10 for one period, if the voltage source 40 supplies a sinusoid alternating voltage. If the temperature of the liquid 37 increases, the semi-conductor element 35 switches on already at lower momentary values of the alternating voltage (FIG. 11). Now one measures in the known manner the phase difference between the zero passage of the alternating voltage and the break-down of the voltage on the semi-conductor element 35. The phase difference can also be indicated in the known manner in a measuring device 41 digitally or analogously and/or used for regulating of a heating or cooling of the vessel 38 by means of a suitable regulator 42 connected to phase meter system 43. The voltage of the source 40 may also have a form different from the sinusoid (for instance a saw-toothed curve or e-function), whereby the connection between the measured phase difference and the temperature to be measured can be influenced (e.g. logarithmic scale for temperature indications). It is also possible to measure the phase difference of the voltage break of two similar semi-conductor elements, where one is in the surrounding temperature that is to be measured, and the other is in a surrounding of constant temperature (control temperature). A greater exactitude of the temperature measurement can thus be achieved.

EXAMPLE 4

Figure 12:
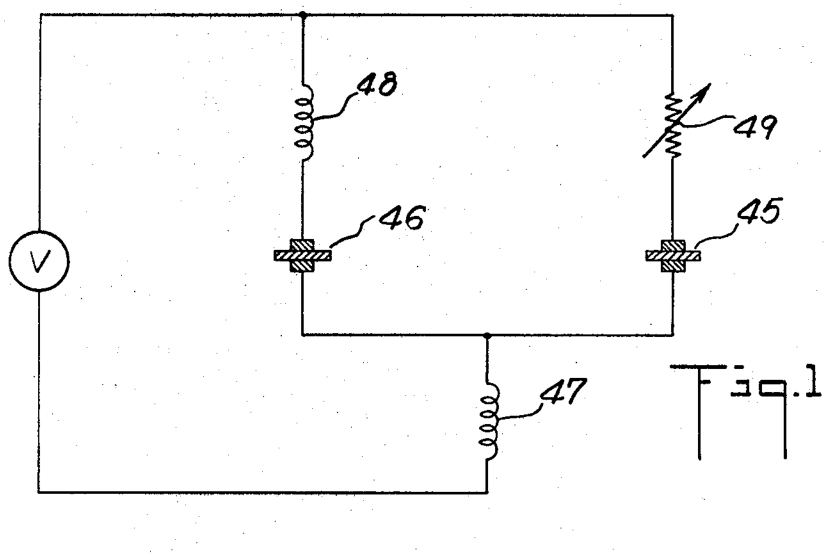
FIG. 12 is a schematic diagram of a system employing two semi-conductor devices for regulating the temperature of an electrically heated equipment.

FIG. 12 shows in principle the diagram for regulating the temperature of an electrically heated device by using two semi-conductor elements.

The semi-conductor element 45 is in good thermal contact with the device whose temperature is to be regulated. The surrounding temperature of semi-conductor element 46 is room temperature or it is situated in a thermostat whose temperature is below the lowest temperature that is to be controlled on the device. The device is heated by a heater coil 47 which is continuously on during operation; the temperature is controlled by switching on and off the additional heater 48 by the semi-conductor element 46.

The temperature is set on the variable resistor 49, the switching off of the additional heater 48 occurs at higher temperatures when the resistor 49 is increased. The voltage V, the heater coils 47 and 48 and the semi-conductor elements 45 and 46 are so dimensioned that at the lowest temperature of the device, semi-conructor element 46 is conducting, and semi-conductor element 45 is non-conducting. If the temperature increases, the element 45 switches on, when the temperature that can be set on resistor 49 has been reached. Thereby the current through semi-conductor element 46 decreases to such an extent that the latter switches off the additional heater 48. When the temperature sinks, semi-conductor element 45 switches off and the additional heater 48 is switched on again by the esemi-conductor element 46. The arrangement is suitable for direct and alternating current.

The invention claimed is:

1. A bistable semi-conductor device for switching and controlling direct and alternating currents, comprising an elementary boron semi-conductor element which has no P-N junction and to which at least two electrodes are directly attached.

2. A semi-conductor device according to claim 1, characterized by the fact that said layer of boron is composed essentially of boron selected from the group consisting of monocrystalline, polycrystalline, and sintered amorphous boron.

3. A semi-conductor device according to claim 1, characterized by the fact that said electrodes constitute cooling surfaces.

4. A semi-conductor device according to claim 1, in which one of said electrodes is a metal wire, and said boron is applied in a thin layer surrounding end engaging said wire, and the other electrode surrounds said layer of boron and is in close contact therewith.

References Cited

UNITED STATES PATENTS

| | | | |
|---|---|---|---|
| 2,928,037 | 3/1960 | Lawrence | 323—68 |
| 3,243,753 | 3/1966 | Kohler | 338—31 |
| 3,284,676 | 11/1966 | Izumi | 317—234 |

JOHN W. HUCKERT, *Primary Examiner.*

R. F. SANDLER, *Assistant Examiner.*

U.S. Cl. X.R.

29—589; 148—174